United States Patent
Etchason

(10) Patent No.: US 9,206,897 B2
(45) Date of Patent: Dec. 8, 2015

(54) METHOD OF SETTING TRANSMISSION SHIFT POINTS IN REAL-TIME BASED UPON AN ENGINE PERFORMANCE CURVE

(71) Applicant: Allison Transmission, Inc., Indianapolis, IN (US)

(72) Inventor: Edmond M. Etchason, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/264,162

(22) Filed: Apr. 29, 2014

(65) Prior Publication Data

US 2014/0236440 A1  Aug. 21, 2014

Related U.S. Application Data

(62) Division of application No. 13/092,470, filed on Apr. 22, 2011, now Pat. No. 8,788,424.

(51) Int. Cl.
| | |
|---|---|
| *G06F 7/00* | (2006.01) |
| *F16H 61/02* | (2006.01) |
| *F16H 59/44* | (2006.01) |
| *B60W 10/11* | (2012.01) |
| *F16H 61/06* | (2006.01) |
| *B60W 10/06* | (2006.01) |
| *F16H 59/74* | (2006.01) |

(52) U.S. Cl.
CPC ............ *F16H 61/0213* (2013.01); *B60W 10/06* (2013.01); *B60W 10/11* (2013.01);
(Continued)

(58) Field of Classification Search
CPC ..... B60W 10/10; B60W 10/02; B60W 10/04; B60W 20/00; F16H 37/08; F16H 3/44; F16H 61/02; F16H 59/24; F16H 61/0213; F16H 61/662; F16H 59/18; F16H 2061/0223; F16H 2061/022; B60T 1/00; B60K 28/16; B60K 6/442; G06F 19/00; B60Y 2300/1882
See application file for complete search history.

(56) References Cited

U.S. PATENT DOCUMENTS 4,730,520 A * 3/1988 Nishikawa et al. ............. 477/61
5,496,227 A * 3/1996 Minowa et al. ................. 477/62
(Continued)

FOREIGN PATENT DOCUMENTS

| JP | 08-210480 A | 8/1996 |
|---|---|---|
| JP | 11-101335 A | 4/1999 |
| WO | 2010-083090 A1 | 7/2010 |

OTHER PUBLICATIONS

Patent Cooperation Treaty (PCT) International Preliminary Report on Patentability and Written Opinion of the International Searching Authority; Oct. 31, 2013; 6 Pages.

*Primary Examiner* — Behrang Badii
(74) *Attorney, Agent, or Firm* — Stephen F. Rost, Esq.; Taft Stettinius & Hollister LLP

(57) ABSTRACT

The present invention provides a method for setting a shift point for shifting a transmission for a powered vehicle between a first gear ratio and a second gear ratio. The method includes determining input power data points based on real-time input torque data. The input torque data includes a maximum input torque. The method also includes calculating a gear step value based on the first gear ratio and second gear ratio. The method further includes determining a first power value and computing a second power value based on the gear step value. The first power value and second power value are compared to one another and adjustments are incrementally made in the first power value speed until the difference between first and second power values meets a threshold. The shift point is therefore based on the result of comparing the first power value and the second power value and the corresponding speed associated with the first power value.

12 Claims, 6 Drawing Sheets

(52) U.S. Cl.
CPC ......... *B60Y2300/1882* (2013.01); *F16H 59/44* (2013.01); *F16H 61/061* (2013.01); *F16H 2059/743* (2013.01); *F16H 2061/022* (2013.01); *F16H 2061/0216* (2013.01); *F16H 2061/0223* (2013.01); *Y10T 477/26* (2015.01)

(56) References Cited

U.S. PATENT DOCUMENTS

| | | | |
|---|---|---|---|
| 5,588,936 A | 12/1996 | Uchida et al. | |
| 6,480,774 B1 | 11/2002 | Snow et al. | |
| 6,708,097 B1* | 3/2004 | Vohmann et al. | 701/68 |
| 7,374,510 B2* | 5/2008 | Unno et al. | 477/44 |
| 7,429,228 B2 | 9/2008 | Hiraiwa | |
| 7,637,839 B2 | 12/2009 | Hiraiwa | |
| 7,824,307 B2 | 11/2010 | Matsubara et al. | |
| 7,912,614 B2* | 3/2011 | Honma et al. | 701/51 |
| 8,100,207 B2* | 1/2012 | Oba et al. | 180/65.285 |
| 8,272,991 B2* | 9/2012 | Katsuta et al. | 477/5 |
| 2007/0254766 A1 | 11/2007 | Hiraiwa | |
| 2008/0032845 A1 | 2/2008 | Hiraiwa | |
| 2008/0096721 A1* | 4/2008 | Honma et al. | 477/120 |
| 2008/0318727 A1 | 12/2008 | Matsubara et al. | |
| 2010/0029436 A1* | 2/2010 | Katsuta et al. | 477/5 |
| 2010/0113213 A1* | 5/2010 | Oba et al. | 477/5 |

* cited by examiner

METHOD OF SETTING TRANSMISSION SHIFT POINTS IN REAL-TIME BASED UPON AN ENGINE PERFORMANCE CURVE

RELATED APPLICATIONS

This application is a divisional of U.S. patent application Ser. No. 13/092,470, filed Apr. 22, 2011 entitled "Method of Setting Transmission Shift Points in Real-Time Based Upon an Engine Performance Curve," the disclosure of which is expressly incorporated herein by reference.

FIELD OF THE DISCLOSURE

The present invention relates to a method for shifting a motor vehicle transmission having a plurality of automatically selectable gear ranges, and in particular, to a method of setting shift points automatically and in real-time for shifting a transmission in a vehicle.

BACKGROUND

A conventional transmission for a powered vehicle includes software or a control scheme for determining when the automatic transmission shifts from one gear range (or ratio) to another gear range. The software or control scheme can include one or more shift schedules for shifting the transmission. The shift schedule can be an economy or performance shift schedule, for example, which controls the shifts based on current driving conditions.

The transmission controller can communicate with an engine in the vehicle. The engine generally includes an engine controller or engine control module. Data or information related to the engine, including torque, power, temperature, pressure, speed, etc., can be communicated to the transmission controller. This data or information can be used by the transmission controller for operating the transmission based on current engine conditions.

In particular, each engine is capable of providing power to the transmission. The engine generally provides different levels of power based on engine speed. The power can be illustrated as a performance curve, for example, in which the power increases to a maximum value. The shape of a performance curve can be different for different engines and this can provide challenges to the transmission controller to adapt the function of the transmission to different engines. This can be particularly challenging to adapt shift schedules for shifting the transmission because the amount of input torque received by the transmission can be different for each engine.

In the past, most engines made peak power at an engine's full load governing speed. However, today's engine manufacturers are being required to reduce emissions and improve fuel economy. To meet these demands, many engines now make peak power at engine speeds less than the full load governing speed. This approach has many consequences to the performance of the transmission. In conventional transmission shift schedules, a transmission would make an upshift (e.g., from a numerically higher gear ratio to a numerically lower gear ratio) near the engine's full load governing speed. As noted, this generally was the point where an engine produced its greatest amount of power. Ideally, the power after making an upshift should be approximately the same as the power before making the shift. This provides the best performance and fuel efficient manner of shifting the transmission.

Due to federal regulations, however, transmission shift schedules must now adapt to different engine performance curves. Since each engine can have its own unique performance curve, transmission shift points can be different for each engine. Thus, shift schedules are dependent on the shape of the engine performance curve and a transmission gear step. Since transmission software must enable a transmission to shift according to any engine performance curve, there is a need for a method to establish shift points for shifting a transmission according to any engine performance curve. There is a further need for determining ideal shift points automatically and in real-time for each gear step based on any engine performance curve.

SUMMARY

The present invention provides a method for setting a shift point for shifting a transmission for a powered vehicle between gear ratios. In an exemplary embodiment, the method includes determining input power data points to the transmission based on input torque data and calculating a gear step value based on a first gear ratio and a second gear ratio. A first power value is determined at a first speed and a second power value is computed at a second speed based on the gear step value. The method further includes comparing the first power value to the second power value and setting the shift point based on the comparison. The input torque data can be received from a data bus, which is electrically coupled to a transmission controller.

In one form of this method, the gear step can be calculated by dividing the first gear ratio by a second gear ratio. In another form thereof, a different speed value can be determined at the maximum input torque and then multiplied by the gear step. The resulting speed can be compared to a full load governing speed value of the vehicle. As such, the shift point may be set to approximately the full load governing speed if the resulting speed exceeds the full load governing speed.

Alternatively, the method can include determining a second input speed value based on the first input speed value. The determination can include dividing the first input speed value by the gear step. To compute the second power value, the method can also include interpolating between at least two input power data points at the second input speed value. As for the comparison step, the method can comprise multiplying the first power value by a threshold value and determining if the second power value is equal to or greater than the result of multiplying the first power value by the threshold value.

In this embodiment, the method can further include adjusting the first speed value if the second power value is less than the result of multiplying the first power value by the threshold value. The first speed value can be adjusted by a constant value up to a full load governing speed of the vehicle.

In another embodiment, a method is provided for establishing a shift point for shifting an automatic transmission in a powered vehicle during a full throttle shift from a first gear ratio to a second gear ratio. The method includes receiving input torque data from a data bus electrically coupled to a transmission controller and converting the input torque data to input power data. A gear step value can be calculated based on the first gear ratio and second gear ratio. The method further includes determining a first input speed and first power value based on the input torque data and computing a second input speed based on the gear step value. A second power value can be determined based on the second input speed. The method also includes comparing the first power value to the second power value and setting the shift point based on the result of comparing the first power value to the second power value.

In one form of this embodiment, the calculating step can comprise dividing the first gear ratio by the second gear ratio. In another form thereof, the determining a first input speed can include determining an engine speed at a maximum input torque and multiplying the engine speed and gear step. The first input speed value, e.g., the product of the engine speed and gear step, can be compared to a full load governing speed value of the vehicle. As such, the shift point can be set to approximately the full load governing speed when the first input speed exceeds the full load governing speed.

In one aspect, the computing a second input speed comprises dividing the first input speed by the gear step value. In another aspect of the method, the determining a second power value can include interpolating the input power data at the second input speed. The method can further include multiplying the first power value by a threshold value and determining if the second power value is equal to or greater than the result of multiplying the first power value by the threshold value. In addition, a different aspect of the method can include adjusting the first speed value if the second power value is less than the result of multiplying the first power value by the threshold value. The first speed value can be adjusted by a predetermined value up to a full load governing speed of the vehicle.

An advantage of determining a shift point using the above-described method is being able to optimize a shift schedule for any given power curve. The shift points can be established in real-time and automatically set based on information and data shared between the engine and transmission. In particular, shift points can be optimized for any engine torque or power curve.

Other advantages include better fuel economy and performance. In addition, the method of setting shift points, as described in the present disclosure, can assist with reducing emissions and noise levels by shifting the transmission at lower engine speeds.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
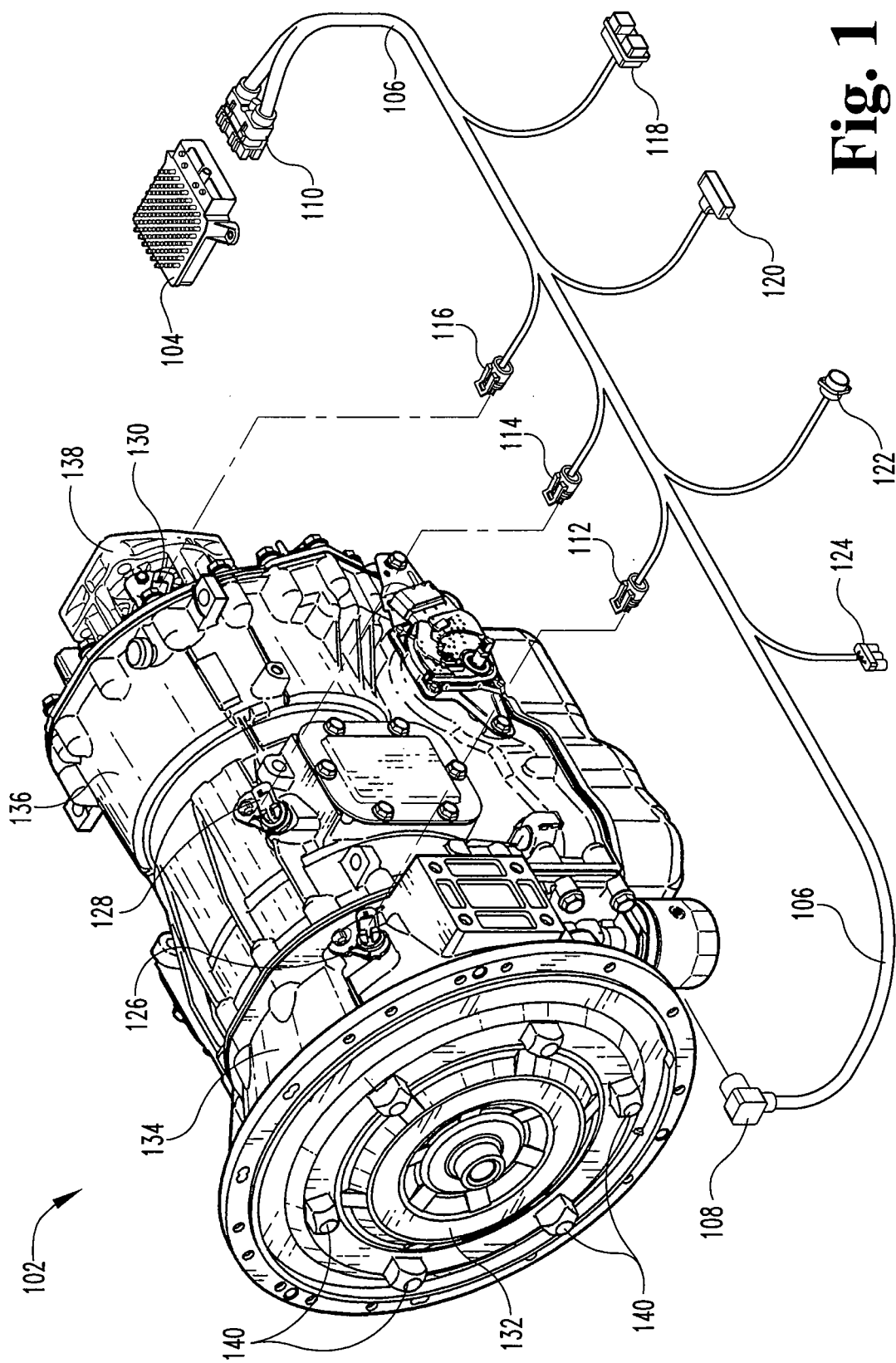
FIG. 1 is a perspective view of one embodiment of a transmission coupled to a controller via a wiring harness.

The present invention relates to a method for calculating or setting shift points for shifting a transmission in a powered vehicle. With reference to FIG. 1, an exemplary embodiment of a transmission setup is provided. A transmission 102 is shown in FIG. 1 with a controller 104, i.e., transmission control module ("TCM"). Software is downloaded to the TCM 104 and a wiring harness 106 couples the TCM 104 to the transmission 102. A conventional wiring harness 106 includes an outer plastic body that surrounds wires that extend from a TCM connector 110 at one end of the wiring harness 106 to a transmission connector 108 disposed at the opposite end of the wiring harness 106.

The wiring harness 106 can also include other connectors such as speed sensor connectors. In FIG. 1, for example, an engine or input speed sensor connector 112 couples to an engine or input speed sensor 126 of the transmission 102. Likewise, in an embodiment in which a torque converter is present, a turbine speed sensor connector 114 couples the wiring harness 106 to a turbine speed sensor 128 of the transmission 102. Also, an output speed sensor connector 116 of the wiring harness 106 couples to an output speed sensor 130 of the transmission 102. Other possible connectors of the wiring harness 106 include a data bus connector 120, a throttle position sensor (TPS) 124, a vehicle connector 118 (e.g., Vehicle Interface Module ("VIM") connector), and an alternative transmission harness mating connector 122. There can be additional connectors and/or harnesses in other embodiments.

As noted, the transmission 102 can include the engine or input speed sensor 126, turbine speed sensor 128, and output speed sensor 130. In this embodiment, the transmission 102 mounts to an engine (not shown) by coupling a converter housing 134 of the transmission 102 to a flywheel housing (not shown) of the engine (not shown). A torque-transferring mechanism 132, e.g., a torque converter or fluid coupling, of the transmission 102 can include a plurality of lugs 140 that couple to a flex plate (not shown) via flex plate bolts (not shown). For purposes of this embodiment, the torque-transferring mechanism 132 will be referred to as a torque converter. In some embodiments, a torque converter may not be present. In these embodiments, an input shaft of the transmission 102 is coupled to the engine via a clutch, for example.

In one embodiment, an internal combustion engine (not shown) can be coupled to the transmission 102 via the torque converter 132 (or input shaft for those embodiments without a torque converter). The internal combustion engine can be configured to rotatably drive an output shaft (not shown) of the engine that is coupled to the input (not shown) of the torque converter 132. The torque converter 132 can further include a turbine (not shown) that is coupled via splines to a turbine shaft (not shown) of the transmission 102. In turn, the turbine shaft (not shown) can be coupled to, or integral with, a rotatable input shaft (not shown) of the transmission 102. An output shaft (not shown) of the transmission 102 can be coupled to or integral with, and rotatably drives, a propeller shaft (not shown) that is coupled to a conventional universal joint (not shown). The universal joint (not shown) can be coupled to, and rotatably drives, a drive axle (not shown) having tires or wheels mounted thereto at each end. The output shaft (not shown) of the transmission 102 drives the tires in a conventional manner via the propeller shaft, universal joint and drive axle.

During operation, as the engine rotatably drives the torque converter 132, the engine or input speed sensor 126 detects the rotational speed of the torque converter 132. The torque converter 132 can include ribs or protrusions (not shown) that protrude from the surface of the torque converter 132 and which the engine or input speed sensor 126 measures during each revolution.

As shown in FIG. 1, the transmission 102 can also include a main case or housing 136 that encloses a gearbox, i.e., gears, dog clutches, clutch plates and reaction plates, a number of automatically selectable gears, planetary gear sets, hubs, pistons, shafts, and other housings. The transmission 102 can further include a turbine shaft (not shown) which can rotate various clutches or shafts in the transmission. A gear or tonewheel (not shown) can be coupled to the turbine shaft (not shown) such that the turbine speed sensor 128, which couples to the main case or housing 136, measures the rotational speed of the gear or tonewheel (not shown). Other transmissions can include alternative ways known to the skilled artisan for measuring turbine speed.

In one embodiment, the transmission 102 can include an output shaft (not shown) which is enclosed by a rear cover 138 of the transmission 102. To measure the output speed of the transmission 102, the output speed sensor 130 can couple to the rear cover 138. A smaller gear or tonewheel (not shown) can be coupled to the output shaft (not shown) such that the output shaft and gear or tonewheel rotate together. The output speed sensor 130 is aligned with the gear or tonewheel and measures the rotational speed of the output shaft.

Transmission shift schedules and other related instructions are included in software which is downloaded to the TCM 104. The TCM 104 can control the shifting of the transmission by electrically transferring instructions to the transmission such that certain actions are carried out by the clutches, dog clutches, pistons, etc. In one non-limiting embodiment, the TCM 104 is part of a transmission control circuit that can further include an electronic solenoid and valve assembly for controlling the engaging and disengaging of clutch assemblies, etc. Components within the transmission 102 can be activated electrically, mechanically, pneumatically, automatically, semi-automatically, and/or manually. The transmission control circuit is able to control the operation of the transmission to achieve desired performance.

Based on instructions in a transmission software program, the transmission control circuit (e.g., TCM 104) can select a shift schedule depending on a vehicle's driving condition and execute instructions contained in the software by sending signals through the wiring harness 106 to control the transmission 102. The TCM 104 can also receive measurement data from the transmission 102 such as, for example, input speed from the input speed sensor 126, turbine speed from the turbine speed sensor 128, and output speed from the output speed sensor 130. In an embodiment in which the transmission does not include a torque converter 132, the transmission may only have an input speed sensor 126 and output speed sensor 130. The TCM 104 can also calculate various parameters including transmission gear ratio or range, which is typically the ratio of input speed to output speed. In an embodiment in which the transmission 102 has a torque converter 132, the transmission gear ratio or range can also be determined by the ratio of turbine speed to output speed.

The TCM 104 can also receive accelerator pedal position (i.e., throttle percentage) from a throttle input source, which can be coupled to an engine control module (ECM) or vehicle control module (VCM) for transmitting throttle data over a data bus. Examples of a conventional data bus include J1587 data bus, J1939 data bus, IESCAN data bus, GMLAN, Mercedes PT-CAN. In addition, a Hardwire TPS (throttle position sensor) to TCM or Hardwire PWM (pulse width modulation) to TCM can be used. Information such as accelerator pedal position that is communicated over the data bus is not limited to a particular engine/transmission configuration. Instead, the data bus can be adapted to most vehicle setups.

In the present disclosure, aspects of a method are provided for calculating or setting shift points for shifting a transmission between two gear ratios. In at least one aspect, an engine having an engine controller provides power to a transmission having a transmission controller. Engine data can be transferred or communicated to the transmission controller over a data bus.

Figure 2:
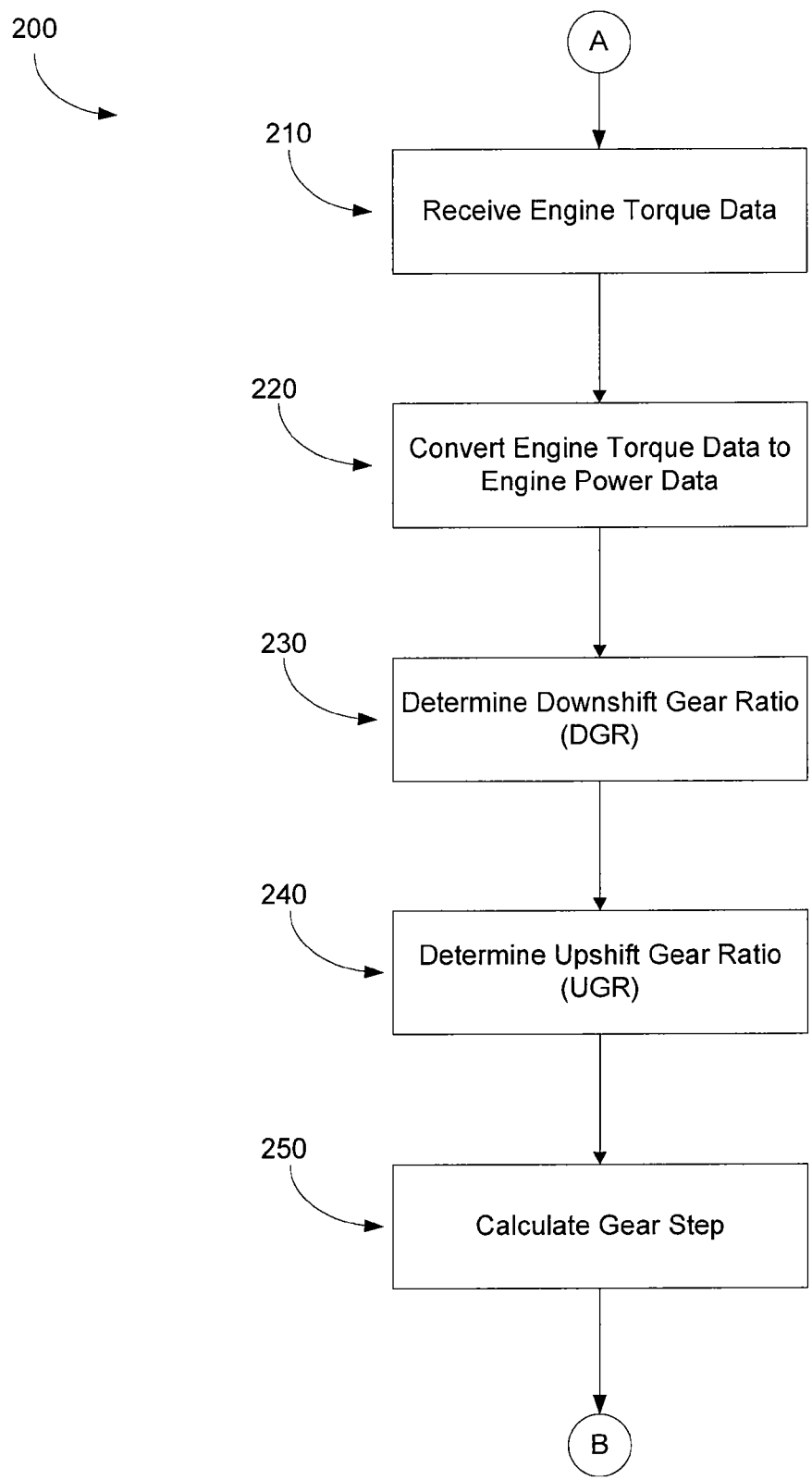
FIG. 2 is a flow chart of an embodiment for selecting a shift point for shifting a transmission.

In an exemplary embodiment shown in FIG. 2, a method 200 is provided for setting a shift point for shifting a transmission between a first gear ratio and a second gear ratio. In method 200, a transmission controller can receive engine data and information from a data bus. For example, in block 210, the controller receives torque data. In one aspect, the controller can receive torque data in the form of a torque curve. This can, for example, be communicated to the transmission controller in the form of an advertised engine torque curve (AETC) in which engine torque data points are provided in relation to engine speed. In a different aspect of the present disclosure, torque data can be communicated in the form of a configuration map. In this form, several engine torque data points are provided to the controller in relation to engine speed. One of the data points can be the peak engine torque and the corresponding engine speed at which this torque is achieved.

In block 220, the controller can convert the torque data into power data. This can be achieved by multiplying the torque by the engine speed and then dividing by a constant value. This calculation is as follows:

POWER,kW=(TORQUE,$N$-$m$)×(ENGINE SPEED, RPM)/9549

In this calculation, the engine speed data is in the form of revolutions per minute. The controller is capable of making this and other calculations in a short amount of time, and therefore the shift point can determined in real-time. In blocks 230 and 240, the controller also performs additional calculations. In block 230, for example, the first gear ratio is determined. In this embodiment, the first gear ratio is referred to as a downshift gear ratio. In other words, if the transmission is shifting from third gear range to fourth gear range, the downshift gear ratio is the gear ratio for the third gear range. Likewise, in block 240, the upshift gear ratio is the gear ratio for the fourth gear range. As previously described, the gear ratio can be determined by the ratio of input speed to output speed.

Once the calculations in blocks 220, 230, and 240 are completed, the controller can compute the transmission gear step in block 250. To do so, the gear step is the ratio of the downshift gear ratio to the upshift gear ratio.

Figure 3:
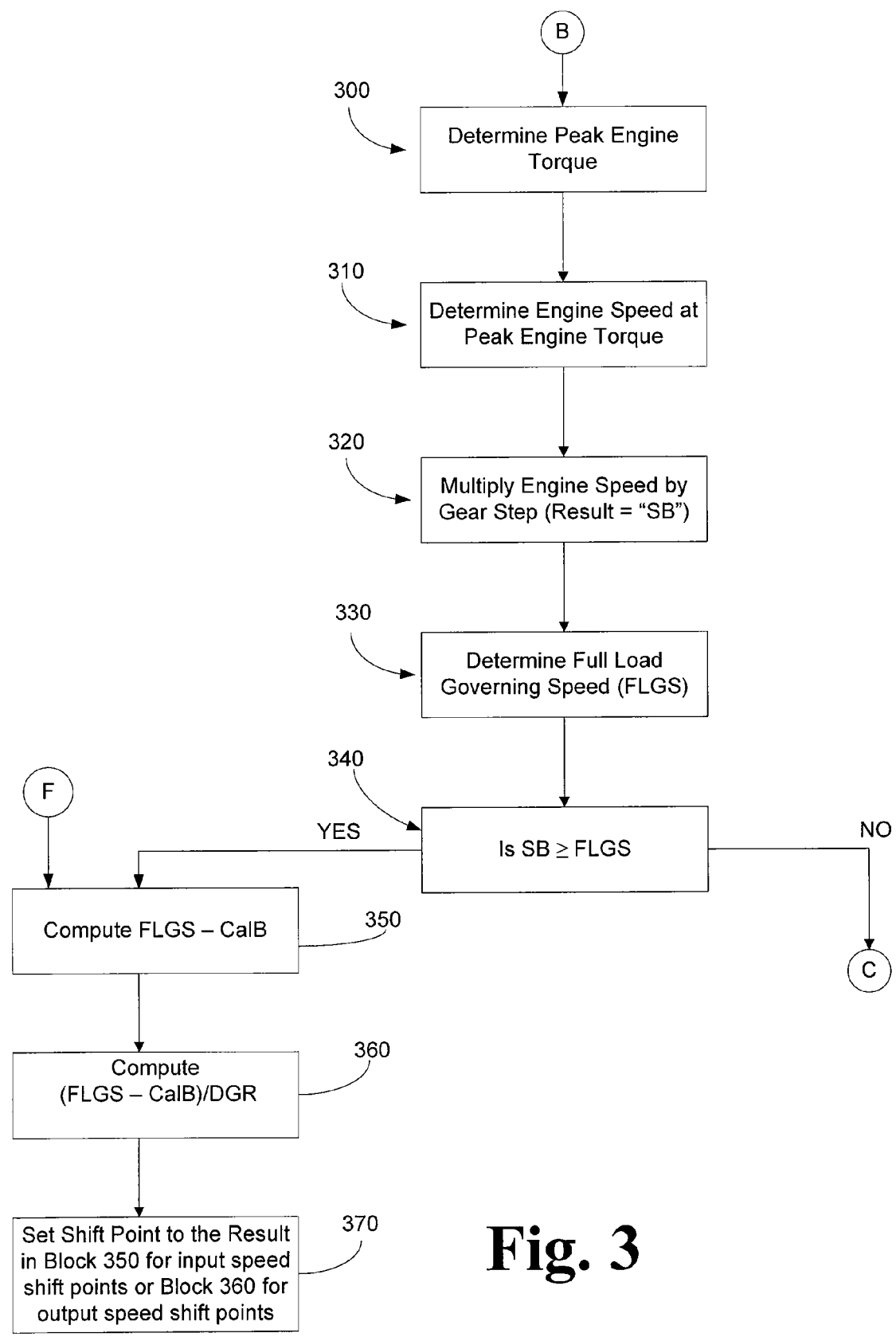
FIG. 3 is another flow chart of the embodiment of FIG. 2.

With reference to FIG. 3, the peak engine torque and corresponding engine speed at the peak engine torque can be determined in blocks 300 and 310, respectively. In some embodiments, an advertised peak engine torque and corresponding engine speed at this advertised torque can be determined. As previously described, this information can be provided in the advertised engine torque curve. The peak engine torque can be communicated to the transmission controller via the data bus. Likewise, the engine speed at which the engine achieves peak torque can be communicated to the controller via the data bus. The peak engine torque (e.g., advertised peak engine torque) and corresponding speed can be obtained from an engine performance curve or from a configuration map. In either case, the peak torque and corresponding engine speed can be directly communicated to the controller.

Once the controller determines the peak engine torque and the corresponding engine speed at this torque, the controller can perform the operation in block 320 of method 200. In block 320, the controller can optionally add or subtract a threshold value, "CalA", to the engine speed determined in block 310. This optional threshold value can be used for tuning purposes. The adjusted engine speed value, i.e., the engine speed value determined in block 310 adjusted by threshold value "CalA", is then multiplied by the gear step calculated in block 250. The result of the calculation in block 320 will be referred to as "SB".

Once the value of "SB" is known, the controller determines the full load governing speed ("FLGS") for the engine in block 330. This speed can be communicated to the controller via the data bus, for example. Once the full load governing speed, FLGS, is known, the controller can compare the value of "SB" to FLGS in block 340. If the value of "SB" is greater than or equal to the full load governing speed, the controller computes an adjusted full load governing speed in block 350. In other words, the value of "SB" is the engine speed or turbine speed at which the controller controls the transmission for making the desired shift. The shift point can be adjusted by reducing the full load governing speed by a threshold value, "CalB". The value of "CalB" can be 50 RPM, for example. The value of "CalB" can typically vary between about 0-125 RPM. The shift point can be set in block 370 to the value computed in block 350 if the shift point is desired in terms of transmission input speed. Alternatively, if it is desired to set the shift point to transmission output speed, the result of block 350 is then divided by the downshift gear ratio in block 360 and the shift point is set to the result computed in block 360. In either case, the shift point is determined for shifting the transmission from the downshift gear ratio to the upshift gear ratio.

The importance of setting the shift point at a slower speed than the full load governing speed in blocks 350 and 360 is because the transmission control system requires time for filling clutch(es), releasing clutch(es), reading transmission output speed, and other functions before completing a shift. By initiating the shift at a speed less than full load governing speed, sufficient time can be allocated to the transmission control system to ensure a smooth shift.

Block 340 is important to method 200 because it can be counterproductive to shift the transmission at a greater speed than the engine's full load governing speed. Once the engine reaches its full load governing speed, the engine typically pulls back or reduces its output power to the transmission. In many engine power curves, the amount of output power or torque produced by the engine is significantly less once the engine reaches its full load governing speed. Engine and transmission performance can be negatively affected by setting shift points after the engine achieves its full load governing speed.

Figure 4:
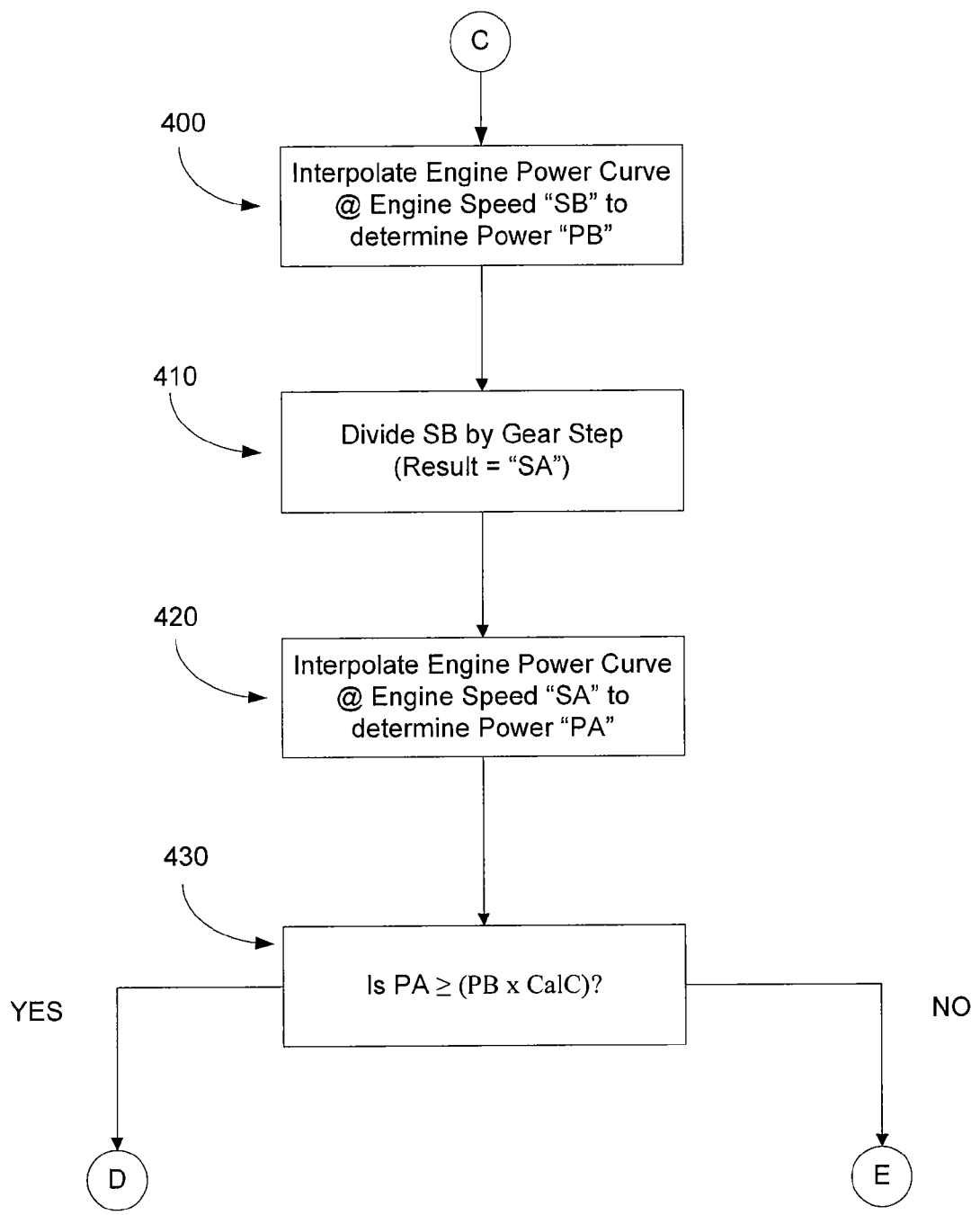
FIG. 4 is another flow chart of the embodiment of FIG. 2.

If the condition set forth in block 340 is not satisfied, method 200 continues to block 400 as shown in FIG. 4. In block 400, the transmission controller determines the engine power at the engine speed "SB". This power, referred to as "PB", can be determined by interpolating the engine power curve if this information is communicated to the controller. Alternatively, if only several engine torque data points are communicated to the controller, the controller interpolates between this data to find the engine power at speed "SB". As described above, if the engine performance data communicated to the controller is torque, the controller can convert torque to power for interpolating in block 400.

Once engine power "PB" is known, the controller can divide engine speed "SB" by the calculated gear step to determine engine speed "SA" in block 410. Once engine speed "SA" is known, the controller can again determine the engine power "PA" at engine speed "SA". In block 420, for example, the controller can interpolate the engine power curve to determine the engine power "PA". Alternatively, if data is in the form of a configuration map, the controller may have to interpolate between two different torque or power data points to determine the value of "PA".

The values of "SA", "SB", "PA", and "PB" are important for setting the shift point between the downshift gear ratio and upshift gear ratio. "SB" refers to the engine speed before the shift and "SA" refers to the engine speed after the shift. Similarly, "PB" refers to engine power before the shift and "PA" refers to engine power after the shift. As described above, to maximize vehicle and transmission performance, it can be important to set transmission shift points such that the power after the shift is about the same as the power before the shift. Thus, method 200 provides a real-time process for automatically determining the engine power and corresponding speed before and after a shift.

Referring to block 430, once the values of "PB" and "PA" are known, the controller can perform a comparison of the two values. As shown in FIG. 4, the value of "PA" can be compared to the value of "PB". A tolerance value, CalC, can be included in the comparison. The value of CalC is a percentage and can be any desirable value. In one embodiment, the value of CalC is between 75-100%. In a different embodiment, the value of CalC is between 90-100%. In another embodiment, the value of CalC is approximately 95%.

When there is no tolerance incorporated in the comparison of block 430, the value of CalC is 100%. As described above, it is desirable for the power after the shift to be approximately the same as the power before the shift. This enables vehicle performance to be maximized. If the condition set forth in block 430 is satisfied, i.e., the value of "PA" is greater than or equal to the value of "PB" multiplied by the tolerance value CalC, method 200 proceeds to block 500 in FIG. 5.

Figure 5:
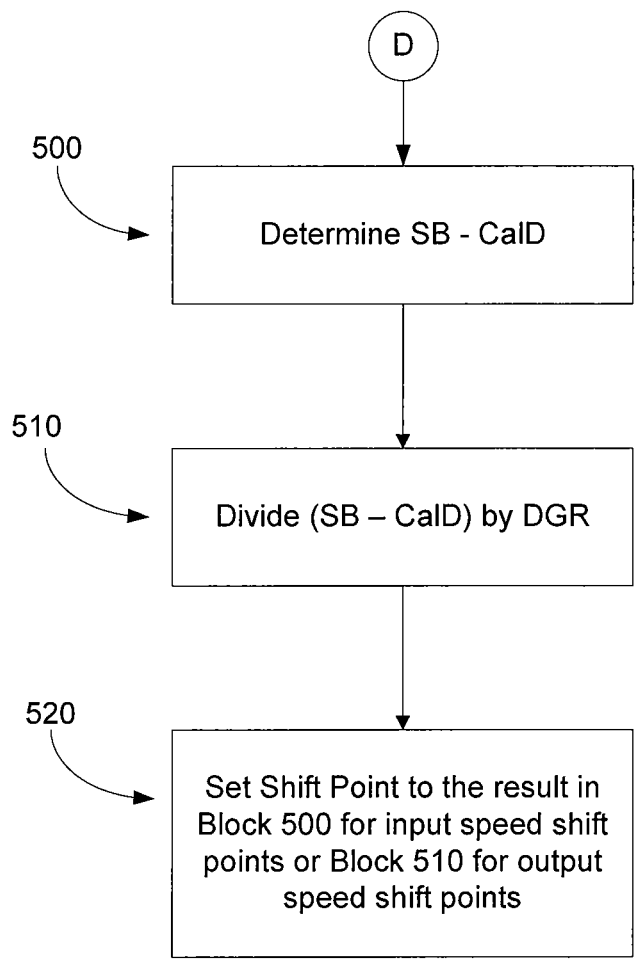
FIG. 5 is another flow chart of the embodiment of FIG. 2.

With reference to FIG. 5, the shift point is set for shifting the transmission from the downshift gear ratio to the upshift gear ratio. In block 500, the value of "SB" can be reduced by another threshold or tolerance value, CalD. The threshold or tolerance value, CalD, serves a similar purpose as threshold value, CalB as described above. The timing of shifting between two gear ratios includes considerations such as the time for filling clutch(es), releasing clutch(es), reading transmission output speed, etc. It can be important for optimal shift quality that the transmission clutches begin being applied or released before the engine speed is pulled down during the shift. For this reason, the engine speed value, "SB", is reduced by CalD so that the start of the shift occurs before the engine is pulled down to complete the shift.

The shift point for shifting from the downshift gear ratio to the upshift gear ratio occurs at the adjusted engine speed value calculated in block 500. In block 510, the adjusted engine speed value calculated in block 500 can be optionally divided by the downshift gear ratio previously calculated in block 230. This calculation in block 510 is not required, and the result of this calculation converts the shift point from engine speed to transmission output speed. In some applications, the shift point is preferred to be referenced in transmission output speed, whereas in other applications the shift point is preferred in terms of engine speed. In either case, the shift point is calculated in block 500 and optionally block 510. Once the shift point is determined, it is programmed into a full throttle shift schedule, for example, in block 520. The shift point can be referenced in terms of engine speed, turbine speed, or transmission output speed. Note that a full throttle shift schedule is only provided as a non-limiting example, as it may be possible to determine shift points in real-time for other types of shift schedules including economy and/or performance shift schedules.

Figure 6:
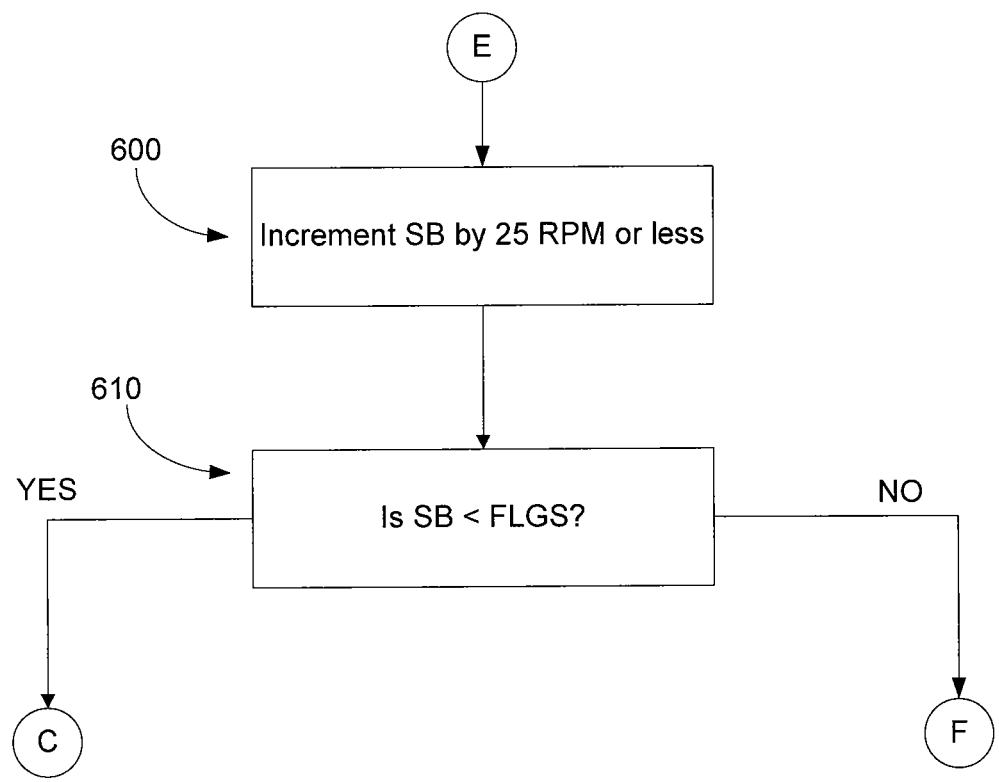
FIG. 6 is another flow chart of the embodiment of FIG. 2.

Returning to FIG. 4, if, however, the condition set forth in block 430 is not satisfied, method 200 proceeds to block 600 (see FIG. 6). In this case, the controller determines that the power after the shift is not substantially the same as the power before the shift. In this event, the controller can incrementally increase the value of "SB" by a constant value such as 25

RPM. The constant value, however, can be set at any desirable value and is not limited to 25 RPM.

Once "SB" has been incrementally changed, the controller compares the new value of "SB" to the full load governing speed in block 610. The comparison in block 610 is similar to the comparison performed in block 340. If the value of "SB" exceeds or is equal to the full load governing speed, method 200 proceeds to block 350. The shift point can be referenced in terms of engine speed, turbine speed, or transmission output speed. If, however, the condition set forth in block 610 is satisfied, i.e., the value of "SB" is less than the full load governing speed, the controller determines the value of "PB" in block 400. As described above, once the value of "PB" is determined in block 400, the values of "SA" and "PA" are determined in blocks 410 and 420, respectively. The comparison in block 430 can be repeated for the new values of "PA" and "PB", and if the condition set forth in block 430 is satisfied, the shift point can be set in block 520. Alternatively, if the condition set forth in block 430 is not satisfied, the controller can incrementally adjust the value of "SB" in block 600 and repeat the comparison of block 610.

The value of "PA" and "PB" may converge such that the condition set forth in block 430 is satisfied. In this case, the desired set point for shifting the transmission between the downshift gear ratio and upshift gear ratio is determined. However, in some instances, the shape of the engine power curve or the size of the gear step may be such that the values of "PA" and "PB" do not converge and the condition set forth in block 430 cannot be satisfied. In this case, the value of "SB" will likely be equal to or greater than the full load governing speed and the transmission shift point can be set according to block 370. In other words, if the condition set forth in block 430 is never satisfied, the controller can set the shift point to the full load governing speed adjusted by any tolerances for shift quality.

Although the above-described embodiments have been described with reference to shifting from a downshift gear ratio to an upshift gear ratio, one skilled in the art can appreciate that the method can be incorporated for other shifts. For example, it may be possible to perform a similar method for setting shift points for a downshift from a numerically lower gear ratio to a numerically higher gear ratio. In this case, CalC would typically be greater than 100%.

Also, while not shown in method 200, the controller can also determine the accelerator pedal position (i.e., throttle position or percentage) and determine whether shift points can be determined according to method 200. In an exemplary embodiment, for example, method 200 can only be used for setting shift points for shifting the transmission between a numerically higher gear ratio to a numerically lower gear ratio at full or 100% throttle. For purposes of the present disclosure, full throttle (FT), wide open throttle (WOT), or 100% throttle refer to the accelerator pedal being fully applied. Alternatively, closed throttle (CT) or 0% throttle refers to the accelerator pedal not being applied (e.g., the vehicle is coasting or braking). In an inbetween condition, the accelerator pedal position can be referred to as partial or part throttle (PT) where the pedal is partially being applied. In various embodiments, method 200 may be applicable for full, closed, and/or partial throttle shifts.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of setting a shift point for shifting a transmission in a powered vehicle between a first gear ratio and a second gear ratio, the transmission having a controller electrically coupled to a data bus and the vehicle having an engine electrically coupled to the data bus, comprising: (a) receiving input torque data from the data bus, the input torque data including a maximum input torque at an engine speed value; (b) calculating input power data based on input torque data; (c) calculating a gear step value based on the first gear ratio and second gear ratio; (d) computing a first speed value based on the engine speed value and gear step value; (e) computing a second speed value based on the first speed value and gear step value; (f) determining a first input power and a second input power from the input power data, the first input power corresponding to the first speed value and the second input power corresponding to the second speed value; (g) comparing the first input power and the second input power to one another; and (h) setting the shift point based on the result of comparing the first input power and the second input power.

2. The method of claim 1, wherein step (c) comprises dividing the first gear ratio by the second gear ratio.

3. The method of claim 1, further comprising comparing the first speed value to a full load governing speed value of the vehicle.

4. The method of claim 1, wherein step (h) comprises setting the shift point to approximately the full load governing speed when the first speed value exceeds the full load governing speed.

5. The method of claim 1, wherein step (e) comprises dividing the first speed value by the gear step value.

6. The method of claim 1, wherein step (f) comprises interpolating between at least two values of the input power data at each speed value.

7. The method of claim 1, wherein step (g) comprises: (i) multiplying the first input power by a threshold value; and (j) determining if the second input power is equal to or greater than the result of step (i).

8. The method of claim 7, further comprising adjusting the first speed value if the second input power is less than the result of multiplying the first input power by the threshold value.

9. The method of claim 8, wherein the first speed value is adjusted by a constant value up to a full load governing speed of the engine.

10. The method of claim 9, further comprising repeating steps (e)-(h) if the second power value is less than the result of step (i).

11. The method of claim 9, further comprising repeating steps (e)-(h) until the second power value is equal to or greater than the result of step (i).

12. The method of claim 9, wherein step (h) comprises setting the shift point to the lesser of a full load governing speed and the first speed value corresponding to the second power value being equal to or greater than the result of step (i).

* * * * *